(12) United States Patent
Lu et al.

(10) Patent No.: US 12,493,153 B2
(45) Date of Patent: Dec. 9, 2025

(54) GENDER CHANGEABLE MULTI-FIBER FIBER OPTIC CONNECTOR

(71) Applicant: CommScope Technologies LLC, Hickory, NC (US)

(72) Inventors: Yu Lu, Eden Prairie, MN (US); Ryan M. Kostecka, Waconia, MN (US)

(73) Assignee: CommScope Technologies LLC, Hickory, NC (US)

( * ) Notice: Subject to any disclaimer, the term of this patent is extended or adjusted under 35 U.S.C. 154(b) by 421 days.

(21) Appl. No.: 18/030,816

(22) PCT Filed: Oct. 13, 2021

(86) PCT No.: PCT/US2021/054841
§ 371 (c)(1),
(2) Date: Apr. 7, 2023

(87) PCT Pub. No.: WO2022/081754
PCT Pub. Date: Apr. 21, 2022

(65) Prior Publication Data
US 2023/0418001 A1    Dec. 28, 2023

Related U.S. Application Data

(60) Provisional application No. 63/092,358, filed on Oct. 15, 2020.

(51) Int. Cl.
*G02B 6/38* (2006.01)
(52) U.S. Cl.
CPC ......... *G02B 6/3882* (2013.01); *G02B 6/3825* (2013.01); *G02B 6/3885* (2013.01)
(58) Field of Classification Search
CPC .. G02B 6/3825; G02B 6/3871; G02B 6/3879; G02B 6/3882
See application file for complete search history.

(56) References Cited

U.S. PATENT DOCUMENTS

| 6,200,040 B1 | 3/2001 | Edwards et al. |
| 6,450,697 B1 | 9/2002 | Ngo |

(Continued)

FOREIGN PATENT DOCUMENTS

| EP | 0961144 | 12/1999 |
| JP | 06034845 | 2/1994 |

(Continued)

OTHER PUBLICATIONS

International Search Report and Written Opinion of the International Searching Authority for International Patent Application No. PCT/US2021/054841 mailed Feb. 11, 2022, 12 pages.

*Primary Examiner* — Eric Wong
(74) *Attorney, Agent, or Firm* — Merchant & Gould P.C.

(57) ABSTRACT

A multi-fiber fiber optic connector is provided having features that allow for changeability with respect to gender. A pin holder is configured to releasably retain a pair of alignment pins and includes top and bottom plates having both ramps and front tabs. Opposing distal ends of the front top and bottom tabs are movable relative to each other between a pin retaining position and a pin release position. When the front top and bottom tabs are in the pin retaining position, the distal ends are engaged at least partially within a circumferential groove of a corresponding alignment pin, and when the front top and bottom tabs are in the pin release position, at least a portion of corresponding top and bottom ramps are spread apart from one another flexing the top and the bottom plates away from each other and disengaging the distal ends from the alignment pin.

21 Claims, 8 Drawing Sheets

(56) References Cited

U.S. PATENT DOCUMENTS

| | | |
|---|---|---|
| 6,464,408 B1 | 10/2002 | Nolan |
| 6,505,976 B1 | 1/2003 | Grois et al. |
| 6,669,377 B2 | 12/2003 | Barnes et al. |
| 6,702,479 B2 | 3/2004 | Yang |
| 7,036,993 B2 | 5/2006 | Luther et al. |
| 7,077,576 B2 | 7/2006 | Luther et al. |
| 7,717,625 B2 | 5/2010 | Margolin et al. |
| 8,636,424 B2 | 1/2014 | Kuffel et al. |
| 8,678,670 B2 | 3/2014 | Takahashi et al. |
| 8,956,056 B2 | 2/2015 | Katagiyama et al. |
| 9,684,139 B2 | 6/2017 | Chang et al. |
| 9,778,425 B2 | 10/2017 | Nguyen et al. |
| 9,817,194 B2 | 11/2017 | Childers et al. |
| 9,823,424 B2 | 11/2017 | Krawczyk et al. |
| 9,933,582 B1 | 4/2018 | Lin |
| 9,977,199 B2 | 5/2018 | Chang et al. |
| 10,114,179 B2 | 10/2018 | Kamada et al. |
| 10,197,746 B2 | 2/2019 | Childers et al. |
| 10,215,932 B2 | 2/2019 | Childers et al. |
| 10,295,759 B2 | 5/2019 | Wong et al. |
| 10,353,156 B2 | 7/2019 | Hill et al. |
| 10,371,903 B1 | 8/2019 | Nguyen et al. |
| 10,409,009 B2 | 9/2019 | Chang et al. |
| 10,520,686 B2 | 12/2019 | Wong et al. |
| 10,712,510 B2 | 7/2020 | Childers et al. |
| 10,712,511 B2 | 7/2020 | Wong et al. |
| 2002/0191919 A1 | 12/2002 | Nolan |
| 2007/0116412 A1 | 5/2007 | Krowiak et al. |
| 2016/0085045 A1 | 3/2016 | Hill et al. |
| 2016/0349464 A1* | 12/2016 | Chang ................ G02B 6/3825 |
| 2017/0102505 A1* | 4/2017 | Nguyen ............ G02B 6/3869 |
| 2018/0239093 A1 | 8/2018 | Chang et al. |
| 2018/0364421 A1 | 12/2018 | Chang et al. |
| 2019/0324218 A1 | 10/2019 | Chang et al. |
| 2019/0384017 A1 | 12/2019 | Lu |
| 2020/0174200 A1 | 6/2020 | Chang et al. |

FOREIGN PATENT DOCUMENTS

| | | |
|---|---|---|
| JP | 2003014983 | 1/2003 |
| WO | 2016/053851 | 4/2016 |

* cited by examiner

GENDER CHANGEABLE MULTI-FIBER FIBER OPTIC CONNECTOR

CROSS-REFERENCE TO RELATED APPLICATIONS

This application is a National Stage Application of PCT/US2021/054841 filed on Oct. 13, 2021, which claims the benefit of U.S. Provisional Application No. 63/092,358, filed on Oct. 15, 2020, the entire disclosures of which are incorporated by reference herein in their entireties. To the extent appropriate, a claim of priority is made to each of the above disclosed applications.

TECHNICAL FIELD

The present disclosure relates generally to fiber optic connectors. More particularly, the present disclosure relates to multi-fiber fiber optic connectors.

BACKGROUND

A multi-fiber fiber optic connector, for example an MPO (Multi-Fiber Push On) connector, typically includes a connector body supporting a multi-fiber ferrule at a front end and a connector boot at a rear end. Typically, an outer release-sleeve (e.g., a grip-sleeve) is mounted on the connector body. The outer release-sleeve is slidable relative to the connector body and is spring biased toward a forward position. When the multi-fiber fiber optic connector is inserted into a corresponding fiber optic adapter, the release-sleeve covers latches of the fiber optic adapter to retain the latches in latched positions relative to the connector body such that the fiber optic connector is prevented from being withdrawn from the adapter. By pulling back on the release-sleeve, the release-sleeve is displaced from the latches of the fiber optic adapter such that the latches can flex outwardly to unlatched positions in which multi-fiber fiber optic connector can be withdrawn from the fiber optic adapter.

An MPO connector can either be male or female. A male MPO connector includes two alignment pins that project forwardly from the multi-fiber ferrule of the connector. A female MPO connector includes alignment openings within the multi-fiber ferrule adapted to receive the alignment pins of a mating male MPO connector. The ability to change genders between male and female MPO connectors in the field is desirable.

MPO connectors typically include a key integrated with the connector housing for determining the polarity of the fiber optic connectors. Depending on the fiber optic system into which the MPO connector is intended to be incorporated, it may be required to have a key on either a bottom side or a top side of the fiber optic connector. The ability to change polarity of the MPO connector in the field is also desirable.

SUMMARY

One aspect of the present disclosure relates to a fiber optic connector including: a connector body having a front end and a rear end, the connector body defining a longitudinal axis extending between the front end and the rear end; a multi-fiber ferrule disposed within the connector body and biased towards the front end of the connector body, the multi-fiber ferrule including a front end, a rear end, a plurality of fiber openings for receiving optical fibers, and a pair of alignment pin openings that extend between the front end and the rear end; a main grip-sleeve body mounted on the connector body and movable relative to the connector body along the longitudinal axis between a forward position and a rearward position; a pair of alignment pins selectively mountable in the pair of alignment pin openings of the multi-fiber ferrule, each alignment pin has a circumferential groove defined adjacent a rear end of the alignment pin; and a pin holder disposed within the connector body and positioned at the rear end of the multi-fiber ferrule, the pin holder configured to releasably retain the pair of alignment pins within the pair of alignment pin openings, the pin holder including: a rear wall; a top plate extending from the rear wall and having left and right top ramps extending therefrom and left and right front top tabs extending therefrom opposite the rear wall, wherein each of the left and right front top tabs are adjacent a respective ramp of the left and right top ramps and spaced therefrom by a gap; and at least one bottom plate extending from the rear wall and having left and right bottom ramps extending therefrom and left and right front bottom tabs extending therefrom opposite the rear wall, wherein each of the left and right front bottom tabs are adjacent a respective ramp of the left and right bottom ramps and spaced therefrom by a gap; wherein opposing distal ends of the left and right, front top and bottom tabs are movable relative to each other between a pin retaining position and a pin release position, wherein when the left and right, front top and bottom tabs are in the pin retaining position, the distal ends are engaged at least partially within the circumferential groove of a corresponding alignment pin of the pair of alignment pins, and when the left and right, front top and bottom tabs are in the pin release position, at least a portion of corresponding left and right, top and bottom ramps are spread apart from one another flexing the top and the at least one bottom plates away from each other and disengaging the distal ends from the alignment pin.

In an example, the rear wall is spaced apart from the left and right, top and bottom ramps by a gap. In another example, each of the left and right, top and bottom ramps are disposed at an acute angle relative respectively to the top or the at least one bottom plate. In yet another example, corresponding left and right, top and bottom ramps, are separated by a passage configured to at least partially receive a tool to move the left and right, front top and bottom tabs towards the pin release position. In still another example, each of the left and right, top and bottom ramps include a return member defining a cutout configured to receive at least a portion of the rear end of the alignment pin. In an example, the cutout of each return member is disposed proximate the left and right, front top and bottom tabs.

In another example, each return member is substantially parallel to the top and the at least one bottom plates. In yet another example, each of the left and right, front top and bottom tabs are disposed at an acute angle relative respectively to the top or the at least one bottom plate. In still another example, the rear wall includes left and right wings configured to engage a ferrule spring. In an example, each of the left and right wings are disposed at an obtuse angle relative to the rear wall.

In another aspect, the technology relates to a fiber optic connector including: a connector body extending along a longitudinal axis and including opposing major sides and opposing minor sides, wherein each of the opposing minor sides defines an access opening; a multi-fiber ferrule disposed within the connector body and including left and right alignment pin openings that extend along the longitudinal axis; a main grip-sleeve body slidably mounted on the connector body; left and right alignment pins mountable in the left and right alignment pin openings of the multi-fiber ferrule; and a pin holder disposed within the connector body and configured to releasably retain the left and right alignment pins within the left and right alignment pin openings, the pin holder including: a rear wall; a top plate extending from the rear wall and having left and right top ramps extending therefrom and left and right front top tabs extending therefrom opposite the rear wall, wherein each of the left and right top ramps are disposed proximate the respective access opening of the connector body, and each of the left and right front top tabs are adjacent a respective ramp of the left and right top ramps and spaced therefrom by a gap; and at least one bottom plate extending from the rear wall and having left and right bottom ramps extending therefrom and left and right front bottom tabs extending therefrom opposite the rear wall, wherein each of the left and right bottom ramps are disposed proximate the respective access opening of the connector body, and each of the left and right front bottom tabs are adjacent a respective ramp of the left and right bottom ramps and spaced therefrom by a gap; wherein corresponding left and right, top and bottom ramps are separated by a passage, the passage extending between the rear wall and the left and right, front top and bottom tabs, wherein opposing distal ends of the left and right, front top and bottom tabs selectively retain the left and right alignment pins and are movable relative to each other between a pin retaining position and a pin release position, and wherein upon inserting a tool within the access opening, the tool contacts corresponding top and bottom ramps to spread apart the left and right, front top and bottom tabs in a direction substantially orthogonal from the longitudinal axis and towards the major sides of the connector body defining the pin release position.

In an example, the distal ends of the left and right, front top and bottom tabs are substantially planar. In another example, each of the top and bottom, left and right ramps extend between and are spaced apart from the rear wall and the respective left and right, front top and bottom tabs. In yet another example, the pin holder is substantially U-shaped. In still another example, the rear wall includes left and right wings extending respectively from left and right edges of the rear wall.

In another aspect, the technology relates to a fiber optic connector including: a connector body having opposite front and rear ends, the connector body also including opposite upper and lower major sides that extend lengthwise between the front and rear ends, the connector body further including opposite left and right minor sides that extend between the upper and lower major sides and also extend lengthwise between the front and rear ends, the connector body defining a central longitudinal axis that extends between the front and rear ends; a multi-fiber ferrule positioned within the connector body adjacent the front end, the multi-fiber ferrule having an elongate transverse cross-sectional profile defining perpendicular major and minor dimensions, the major dimension extending between the left and right minor sides of the connector body and the minor dimension extending between the upper and lower major sides, the multi-fiber ferrule defining a plurality of fiber openings for receiving optical fibers, at least one of the fiber openings being arranged in a row that extends along the major dimension of the multi-fiber ferrule, the multi-fiber ferrule being movable relative to the connector body along the central longitudinal axis of the connector body, the multi-fiber ferrule defining left and right alignment pin openings that extend along the central longitudinal axis of the connector body when the multi-fiber ferrule is positioned within the connector body; a spring stop mounted within the rear end of the connector body; a ferrule spring for biasing the multi-fiber ferrule in a forward direction relative to the connector body, the ferrule spring being located within the connector body and being captured between the spring stop and the multi-fiber ferrule; a main grip-sleeve body mounted on the connector body, the main grip-sleeve body including upper and lower major sides that respectively oppose the upper and lower major sides of the connector body, the main grip-sleeve body also including left and right minor sides that respectively oppose the left and right minor sides of the connector body, the main grip-sleeve body being movable relative to the connector body along the central longitudinal axis of the connector body between a forward position and a rearward position; left and right alignment pins mountable in the left and right alignment pin openings of the multi-fiber ferrule, the left and right alignment pins further including circumferential grooves defined adjacent rear ends of the left and right alignment pins; and a pin holder positioned at a rear end of the multi-fiber ferrule for releasably retaining the left and right alignment pins within the left and right alignment pin openings, the pin holder including: a rear wall having left and right wings extending therefrom, the left and right wings configured to engage with the ferrule spring; a top plate extending from the rear wall and having left and right top ramps extending therefrom and left and right front top tabs extending therefrom opposite the rear wall, wherein each of the left and right top ramps are disposed proximate the minor sides of the connector body and each of the left and right front top tabs are adjacent a respective ramp of the left and right top ramps and spaced therefrom by a gap; and at least one bottom plate extending from the rear wall and having left and right bottom ramps extending therefrom and left and right front bottom tabs extending therefrom opposite the rear wall, wherein each of the left and right bottom ramps are disposed proximate the minor sides of the connector body and each of the left and right front bottom tabs are adjacent a respective ramp of the left and right bottom ramps and spaced therefrom by a gap; wherein opposing distal ends of the left and right, front top and bottom tabs are movable relative to each other between a pin retaining position and a pin release position, wherein when the left and right, front top and bottom tabs are in the pin retaining position, the distal ends are engaged at least partially within the circumferential groove of a corresponding alignment pin of the left and right alignment pins.

In an example, each of the opposing minor sides of the connector body defines a tool access opening, and corresponding left and right, top and bottom ramps are longitudinally aligned with the tool access opening, and upon inserting a tool within the tool access opening, the tool contacts the corresponding top and bottom ramps to spread apart the left and right, front top and bottom tabs in a direction along the minor dimension and towards the major sides of the connector body defining the pin release position. In another example, each of the left and right, top and bottom ramps include a return member defining a cutout configured to receive at least a portion of the rear end of the respective alignment pin, and each return member is substantially parallel to the top and the at least one bottom plates. In yet another example, the at least one bottom plate includes two discrete members. In still another example, the distal ends of the left and right, front top and bottom tabs are devoid of notches that correspond in shape to the left and right alignment pins. In another example, front surfaces of the left and right, front top and bottom tabs taper inwardly respectively from the top or at least one bottom plate.

A variety of advantages of the disclosure will be set forth in part in the description that follows, and in part will be apparent from the description, or may be learned by practicing the various aspects of the present disclosure. It is to be understood that both the forgoing general description and the following detailed description are exemplary and explanatory only and are not restrictive of the broad inventive concepts upon which the examples are based.

DETAILED DESCRIPTION

MPO connectors are generally configured as either "male" and having two protruding alignment pins, or "female" having two holes for receiving the alignment pins so as to ensure fiber channel connections. This gender of the MPO connector is typically established during initial assembly of the connector, however, it is desirable to change the gender of the MPO connector after assembly is complete. To perform this function, the alignment pins must be either removed or installed depending on which gender is required or desired.

The connectors and pin holders described herein enable the alignment pins to be inserted into a female connector such that they are securely held in position, or with the use of a tool, the pins can easily be removed from a male connector without disassembling the MPO connector. The pin holder has a rear wall with top and bottom plates extending therefrom. The top plate has left and right top ramps extending downward and left and right front tabs extending downward. Similarly, the bottom plate has left and right bottom ramps extending upward and left and right front tabs extending upward. The ramps and tabs defined pin retention chambers to selectively engage with features on the alignment pin to hold them in place. To remove the alignment pins, a tool can be inserted through an access opening defined in the housing of the connector to flex the pin holder so that the pins are released and removable. In the example, the top and bottom plates flex away from each other such that distal ends of the top and bottom front tabs are used to releasably secure the alignment pins. The top and bottom ramps are used to receive the tool and generate the flexing movement of the top and bottom plates. The pin holder does not need to be removed from the housing to insert and remove the alignment pins. Additionally, inserting and removing the alignment pins can be performed multiple times as required or desired.

Figure 1:
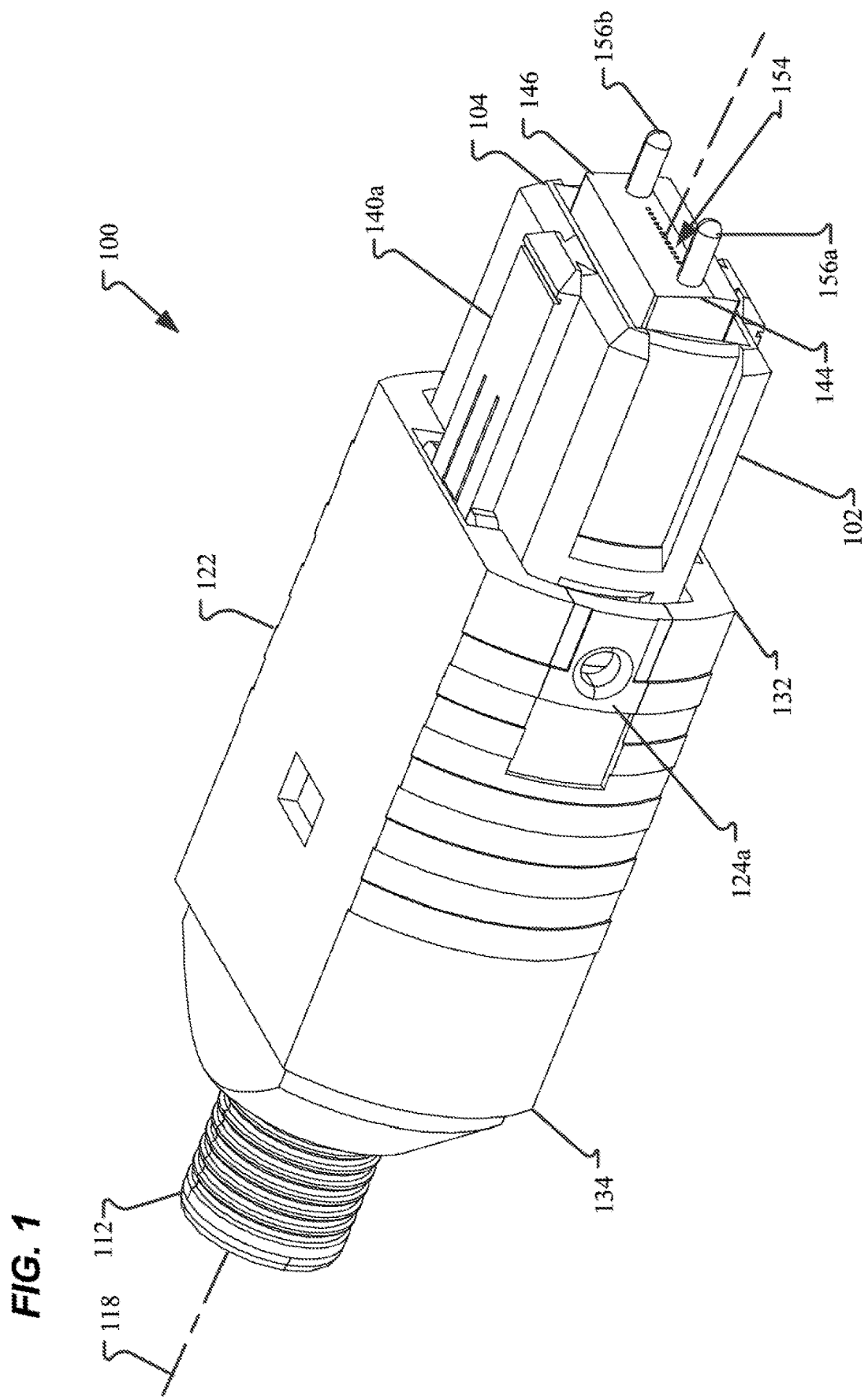
FIG. 1 is a perspective view of a multi-fiber fiber optic connector in accordance with the principles of the present disclosure.
Figure 2:
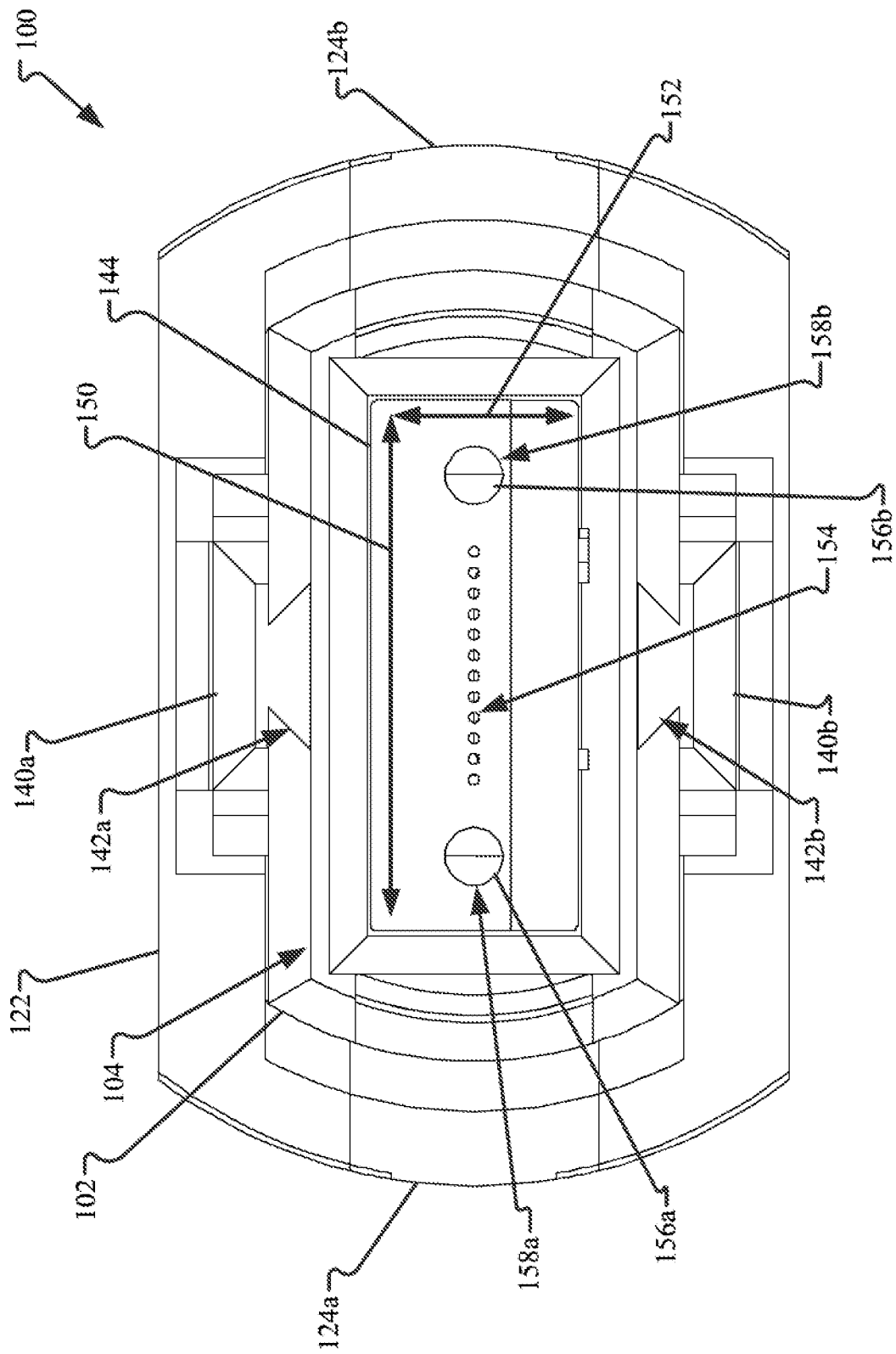
FIG. 2 is a front view of the multi-fiber fiber optic connector of FIG. 1.
Figure 3:
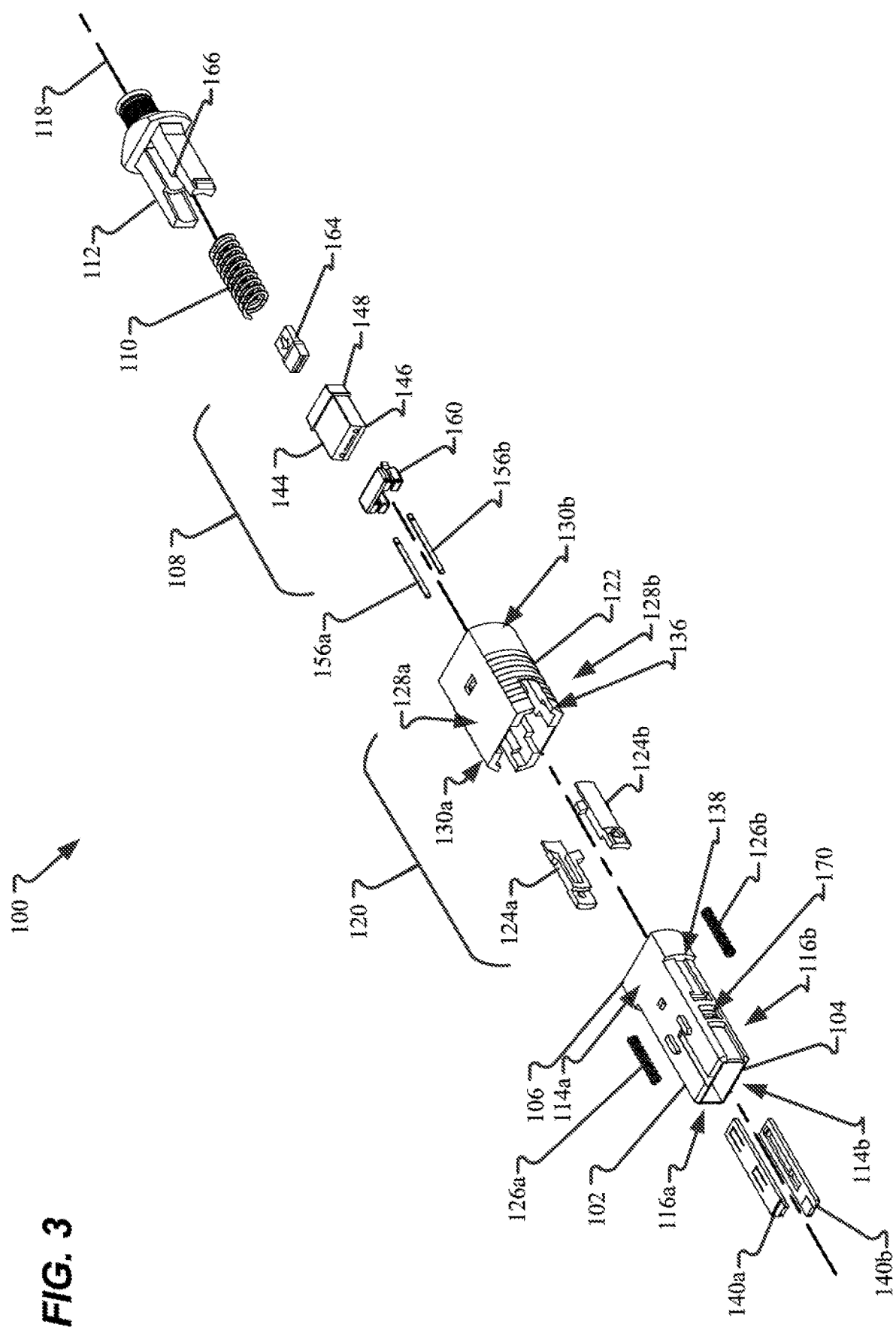
FIG. 3 is an exploded view of the multi-fiber fiber optic connector of FIG. 1.
Figure 4:
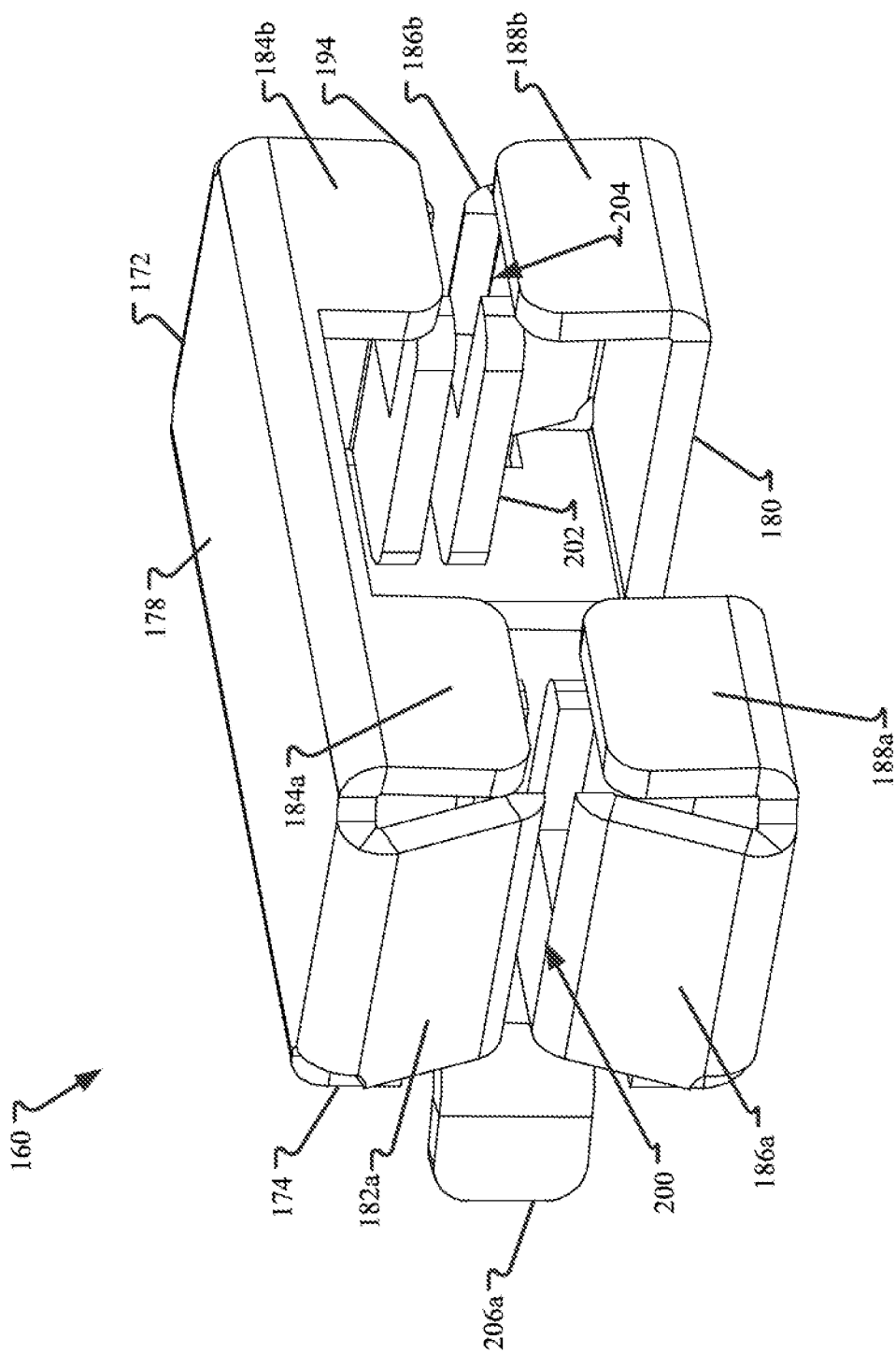
FIG. 4 is a perspective view a pin holder of the multi-fiber fiber optic connector of FIG. 1.

FIG. 1 is a perspective view of a multi-fiber fiber optic connector 100 in accordance with the principles of the present disclosure. FIG. 2 is a front view of the multi-fiber fiber optic connector 100. FIG. 3 is an exploded view of the multi-fiber fiber optic connector 100. Referring concurrently to FIGS. 1-3, the multi-fiber fiber optic connector 100 has enhanced functionality at least relating to the ability to easily change gender of the connector 100. Additionally, the multi-fiber fiber optic connector 100 enables polarity to be changed and for operation as a true push-pull fiber optic connector (e.g., a true push-pull MPO connector). A true push-pull fiber optic connector is a connector in which the outer grip sleeve can be grasped during both insertion of the connector into a fiber optic adapter and during removal of the connector from the fiber optic adapter. The structure that enables the polarity to be changed and for push-pull functionality is further described in U.S. patent application Ser. No. 16/445,487, filed Jun. 19, 2019, and incorporated by reference herein in its entirety.

In the example, the multi-fiber fiber optic connector 100 includes a connector body 102 having a front end 104 and an opposite rear end 106. A ferrule assembly 108 of the multi-fiber fiber optic connector 100 is configured to mount within an interior of the connector body 102. A spring 110 of the multi-fiber fiber optic connector 100 is configured to bias the ferrule assembly 108 in a forward direction relative to the connector body 102. The multi-fiber fiber optic connector 100 also includes a rear spring stop 112 configured to mount within the rear end 106 of the connector body 102. The rear spring stop 112 is configured to retain the spring 110 within the connector body 102. In some examples, a rear connector boot (not shown) is configured to mount to a rear end of the rear spring stop 112. The rear connector boot can have a flexible configuration for providing optical fiber bend radius protection and strain relief at the rear end of the multi-fiber fiber optic connector 100. It will be appreciated that in use, the connector 100 mounts at the end of a fiber optic cable (not shown), and the boot preferably provides flexible support where the cable enters the rear of the connector 100.

The connector body 102 includes opposite upper and lower major sides 114a, 114b that extend lengthwise between the front end 104 and the rear end 106. Additionally, the connector body 102 includes opposite left and right minor sides 116a, 116b that extend between the upper and lower major sides 114a, 114b and extend lengthwise between the front end 104 and the rear end 106. The connector body 102 defines a longitudinal axis 118 that extends between the front end 104 and the rear end 106.

The multi-fiber fiber optic connector 100 further includes an outer grip-sleeve assembly 120 configured to mount over the connector body 102. The outer grip-sleeve assembly 120 includes a main grip-sleeve body 122 and separate left and right adapter latch locks 124a, 124b. Left and right grip-sleeve assembly springs 126a, 126b are used to bias the outer grip-sleeve assembly 120 in a forward direction when the outer grip-sleeve assembly 120 is mounted on the connector body 102. The main grip-sleeve body 122 includes opposite upper and lower major sides 128a, 128b that respectively oppose the upper and lower major sides 114a, 114b of the connector body 102. Additionally, the main grip-sleeve body 122 includes opposite left and right minor sides 130a, 130b that extend between the upper and lower major sides 128a, 128b and that respectively oppose the left and right minor sides 116a, 116b of the connector body 102. The main grip-sleeve body 122 also includes a front end 132 and a rear end 134 and extends along the longitudinal axis 118.

The left and right minor sides 130a, 130b of the main grip-sleeve body 122 have notches 136 at the front end 132 that at least partially receive the adapter latch locks 124. In other examples, the left and right minor sides 130a, 130b extend all the way to the front end 132 such that all of the sides 128, 130 of the body 122 terminate on the same front end plane with no notches formed at the front end. The interior of the main grip-sleeve body 122 also includes structure for guiding and stopping movement of the left and right adapter latch locks 124a, 124b relative to the main grip-sleeve body 122. The left and right adapter latch locks 124a, 124b respectively mount at the left and right minor sides 130a, 130b of the main grip-sleeve body 122. When mounted within the main grip-sleeve body 122, the left and right adapter latch locks 124a, 124b are movable along the longitudinal axis 118 relative to the main grip-sleeve body 122 between forward positions and rearward positions. In the example, the left and right adapter latch locks 124a, 124b are separate pieces that are moveable relative to each other along the longitudinal axis 118 of the connector body 102 and are also movable relative to the main grip-sleeve body 122 along the longitudinal axis 118. The left and right adapter latch locks 124a, 124b each are at least partially disposed within the main grip-sleeve body 122 and between the front end 132 and the rear end 134.

In certain aspects, each adapter latch lock 124 is positioned within and at least partially enclosed by the left and right minor sides 130a, 130b of the main grip-sleeve body 122. Additionally, each adapter latch lock 124 forms a spring stop for the left and right grip-sleeve assembly springs 126a, 126b so as to allow the springs 126a, 126b to bias the adapter latch locks 124a, 124b in a forward direction relative to the main grip-sleeve body 122.

The left and right grip-sleeve assembly springs 126a, 126b respectively mount within left and right spring grooves 138 defined by the connector body 102 on the left and right minor sides 116a, 116b. The main grip-sleeve body 122 is slidably mounted on the connector body 102 and is movable relative to the connector body 102 along the longitudinal axis 118 between a forward position (e.g., a position further towards the front end 104 of the connector body 102) and a rearward position (e.g., a position further towards the rear end 106 of the connector body 102). The grip-sleeve assembly springs 126 bias the main grip-sleeve body 122 in its forward position. Additionally, the left and right grip-sleeve assembly springs 126a, 126b function to bias the left and right adapter latch locks 124a, 124b to forward positions relative to the main grip-sleeve body 122. However, the adapter latch locks 124 can move relative to the main grip-sleeve body 122 so that in operation, the outer grip-sleeve assembly 120 enables the true push-pull functionality of the multi-fiber fiber optic connector 100.

The multi-fiber fiber optic connector 100 further includes upper and lower keys 140a, 140b adapted to be slidably mounted respectively at the upper and lower major sides 114a, 114b of the connector body 102 and adjacent the front end 104 of the connector body 102. The connector body 102 includes structure for accommodating the upper and lower keys 140a, 140b. In the example, the upper and lower keys 140a, 140b respectively slidably mount to the upper and lower major sides 114a, 114b of the connector body 102. The upper and lower keys 140a, 140b each are slidably movable along the longitudinal axis 118 relative to the connector body 102 between forward and rearward positions. To accommodate sliding movement of the upper and lower keys 140a, 140b, the connector body 102 defines upper and lower longitudinal key mounting slots 142a, 142b that extend longitudinally along the connector body 102 in a rearward direction from the front end 104 of the connector body 102. In operation, the selective mounting of the upper and lower keys 140a, 140b enables the polarity of the multi-fiber fiber optic connector 100 to be changed as required or desired.

The ferrule assembly 108 of the multi-fiber fiber optic connector 100 includes a multi-fiber ferrule 144 that is positioned within the connector body 102 adjacent the front end 104 of the connector body 102 when the ferrule assembly 108 has been installed within the connector body 102. The multi-fiber ferrule 144 has a front end 146 and an opposite rear end 148, and an elongate transverse cross-sectional profile defining perpendicular major and minor dimensions 150, 152 relative to the longitudinal axis 118 (shown FIG. 2). With the multi-fiber ferrule 144 installed in the connector body 102, the major dimension 150 extends between the left and right minor sides 116a, 116b of the connector body 102 and the minor dimension 152 extends between the upper and lower major sides 114a, 114b of the connector body 102. The multi-fiber ferrule 144 defines a plurality of fiber openings 154 for receiving optical fibers corresponding to a fiber optic cable which is terminated by the multi-fiber fiber optic connector 100. At least some of the fiber openings 154 are arranged in a row that extends along the major dimension 150 of the multi-fiber ferrule 144.

The multi-fiber ferrule 144, when installed in the connector body 102, is movable relative to the connector body 102 along the longitudinal axis 118 and is spring biased toward a forward position relative to the connector body 102 by the ferrule biasing spring 110. The ferrule assembly 108 also includes left and right ferrule alignment pins 156a, 156b that mount within corresponding left and right alignment pin openings 158a, 158b in the multi-fiber ferrule 144 when the multi-fiber fiber optic connector 100 is configured as a male connector. The left and right alignment pin openings 158a, 158b extend between the front end 146 and the rear end 148 of the multi-fiber ferrule 144 and along the longitudinal axis 118. When the ferrule alignment pins 156a, 156b are selectively mounted within the alignment pin openings 158a, 158b, the ferrule alignment pins 156a, 156b are retained within the alignment pin openings 158a, 158b by a pin holder 160 that is disposed at the rear end 148 of multi-fiber ferrule 144.

The pin holder 160 is disposed within the connector body 102. In certain examples, the pin holder 160 is held against the rear end 148 of the multi-fiber ferrule 144 by the ferrule biasing spring 110. In the example, the ferrule alignment pins 156a, 156b include circumferential grooves 162 (shown FIGS. 9 and 10) adjacent rear ends of the ferrule alignment pins 156a, 156b which are engaged by the pin holder 160 to retain the ferrule alignment pins 156a, 156b within the alignment pin openings 158a, 158b. When the multi-fiber fiber optic connector 100 is configured as a female fiber optic connector, the ferrule alignment pins 156a, 156b are not present within the alignment pin openings 158a, 158b such that when the female fiber optic connector is mated with a corresponding male fiber optic connector, the ferrule alignment pins of the male fiber optic connector can be received within the alignment pin openings 158a, 158b to provide alignment between the multi-fiber ferrules of the mated fiber optic connectors.

The ferrule assembly 108 additionally includes a ferrule boot 164 that is assembled within the rear end of the multi-fiber ferrule 144. The ferrule boot 164 is configured for receiving the optical fibers that are routed into the multi-fiber ferrule 144 from the cable to which the multi-fiber fiber optic connector 100 is terminated. For example, the ferrule boot 164 can define a through passage for receiving optical fibers routed into the multi-fiber ferrule 144 from the optical cable to which the multi-fiber fiber optic connector 100 is terminated/mounted.

In the example, the ferrule assembly 108, the ferrule biasing spring 110, and the rear spring stop 112 are all loaded into the connector body 102 through the rear end 106 of the connector body 102. The ferrule biasing spring 110 has a front end that seats against the pin holder 160 and a rear end that abuts against a spring seat 166 of the rear spring stop 112.

It is appreciated that the pin holder 160 of the ferrule assembly 108 includes structure for selectively retaining the ferrule alignment pins 156a, 156b within the alignment pin openings 158a, 158b. In the example, at least a portion of the pin holder 160 is accessible from outside the multi-fiber fiber optic connector 100 to allow the ferrule alignment pins 156a, 156b to be released from the alignment pin openings 158a, 158b and convert the multi-fiber fiber optic connector 100 from a male configuration to a female configuration as required or desired. Thus, the pin holder 160 preferably includes retaining elements or structures that are movable between retaining positions and release positions. In the examples described herein, retaining structures can include resilient or spring-like structures that are inherently spring biased toward the retaining positions and that can be moved to the released positions by means such as a tool 168 (shown in FIG. 9). The tool 168 can be inserted at least partially into the multi-fiber fiber optic connector 100 and access the pin holder 160 without requiring disassembly of the multi-fiber fiber optic connector 100.

In the example, the connector body 102 defines left and right pin release access openings 170 that are respectively defined through the minor sides 116a, 116b of the connector body 102. The left and right access openings 170 can be accessed by manually pulling back the main grip-sleeve body 122 from the forward position to the rearward position. When the main grip-sleeve body 122 is in the rearward position, the pin release access openings 170 are exposed. At least a portion of the pin holder 160 overlaps or aligns with the pin release access openings 170. In operation, by pulling back the main grip-sleeve body 122 to expose the left and right pin release access openings 170, the release tool 168 can be inserted through the openings 170 so as to release the ferrule alignment pins 156a, 156b from the pin holder 160 and be removed from their corresponding alignment openings 158a, 158b. In an aspect, the alignment pins 156a, 156b can be pulled forwardly from the alignment openings 158a, 158b along the longitudinal axis 118. In certain examples, it may be necessary to push the ferrule 144 rearwardly into the connector body 102 against the bias of the spring 110 to bring the pin holder 160 into longitudinal alignment with the release access openings 170.

FIGS. 4-8 depict the pin holder 160. Referring concurrently to FIGS. 4-8, the pin holder 160 is formed by a body 172. The body 172 is substantially U-shaped with an open central region through which the ferrule boot 164 (shown in FIG. 3) extends. In an aspect, the body 172 may have a stamped sheet-metal construction for increased manufacturing efficiencies while retaining resilient spring like properties. In other aspects, the body 172 may be additively manufactured (e.g., 3D printed). In the example, the body 172 is unitary. The pin holder 160 includes a rear wall 174 having a substantial U-shape and defining an open central region 176. The rear wall 174 has a top plate 178 and at least one bottom plate 180 extending in a forward direction relative to the longitudinal axis 118. In the example, the bottom plate 180 is separated into discrete two members such that the body 172 has its U-shape. In other examples, the bottom plate 180 may extend across the open central region 176 and be a single member as required or desired. In the example, the top plate 178 and the bottom plate 180 each cantilever from the rear wall 174.

The top plate 178 has left and right top ramps 182a, 182b extending from the left and right sides and in a downward direction towards the bottom plate 180. The left and right top ramps 182a, 182b oppose the minor sides 116a, 116b of the connector body 102 and are adjacent the upper major side 118a (all shown in FIG. 3) when the pin holder 160 is disposed within the connector body 102. The left and right top ramps 182a, 182b also at least partially align with the corresponding left and right pin release access openings 170 (shown in FIG. 3) so that the ramps are accessible from the outside of the connector 100 with the tool 168 (shown in FIG. 9). The left and right top ramps 182a, 182b cantilever from the sides of the top plate 178. Additionally, the top plate 178 has left and right front top tabs 184a, 184b extending from the front of the top plate 178, opposite the rear wall 174, and in a downwards direction towards the bottom plate 180. The left and right front top tabs 184a, 184b are disposed adjacent the rear end 148 of the ferrule 144 (shown in FIG. 3) when assembled within the connector body 102. The left top ramp 182a is adjacent the left front top tab 184a and the right top ramp 182b is adjacent the right front top tab 184b. The left and right front top tabs 184a, 184b cantilever from the front of the top plate 178 and are separate from the left and right top ramps 182a, 182b.

The bottom plate 180 has left and right bottom ramps 186a, 186b extending from the left and right sides and in an upward direction towards the top plate 178. The left and right bottom ramps 186a, 186b oppose the minor sides 116a, 116b of the connector body 102 and are adjacent the lower major side 118b (shown in FIG. 3) when the pin holder 160 is disposed within the connector body 102. The left and right bottom ramps 186a, 186b also at least partially align with the corresponding left and right pin release access openings 170 so that the ramps are accessible from the outside of the connector 100 with the tool 168. The left and right bottom ramps 186a, 186b cantilever from the sides of the bottom plate 180. Additionally, the bottom plate 180 has left and right bottom tabs 188a, 188b extending from the front of the bottom plate 180, opposite the rear wall 174, and in an upwards direction towards the top plate 178. The left and right front bottom tabs 188a, 188b are disposed adjacent the rear end 148 of the ferrule 144 when assembled within the connector body 102. The left bottom ramp 186a is adjacent the left front bottom tab 188a and the right bottom ramp 186b is adjacent the right front bottom tab 188b. The left and right front bottom tabs 188a, 188b cantilever from the front of the bottom plate 180 and are separate from the left and right bottom ramps 186a, 186b.

The left and right top ramps 182a, 182b are spaced apart from both the rear wall 174 and the front top tabs 184a, 184b by a respective gap 190, 192. Similarly, the left and right bottom ramps 186a, 186b are spaced apart from both the rear wall 174 and the front bottom tabs 188a, 188b by the respective gap 190, 192. The gaps 190, 192 extend from the top plate 178 or bottom plate 180 along the length of the entire extension. In an aspect, the gap 190 between the ramps 182, 186 and the rear wall 174 is less than the gap 192 between the ramps 182, 186 and the front tabs 184, 188. By separating the ramps 182, 186 from both the rear wall 174 and the front tabs 184, 188, the movement of the pin holder 160 between a pin retaining position and a pin release position is more easily enabled.

In the example, corresponding left and right, front top and bottom tabs 184, 188 are configured to engage and retain the alignment pins 156a, 156b. (shown in FIG. 3) Distal ends 194 of the front tabs 184, 188 are spaced apart from one another such that the rear end of the alignment pins 156a, 156b are removably received within the pin holder 160. The distal ends 194 of the front top and bottom tabs 184, 188 are moveable M relative to each other between a pin retaining position and a pin release position. In an aspect, the distal ends 194 are substantially planar and devoid of any grooves or notches that correspond in shape and size to the alignment pins 156. By having planar distal ends 194, alignment tolerances between the ferrule 144 and the pin holder 160 is reduced, thereby increasing performance and efficiencies of the connector 100. In other aspects, the distal ends 194 may include grooves or notches for the alignment pins 156 as required or desired.

Figure 5:
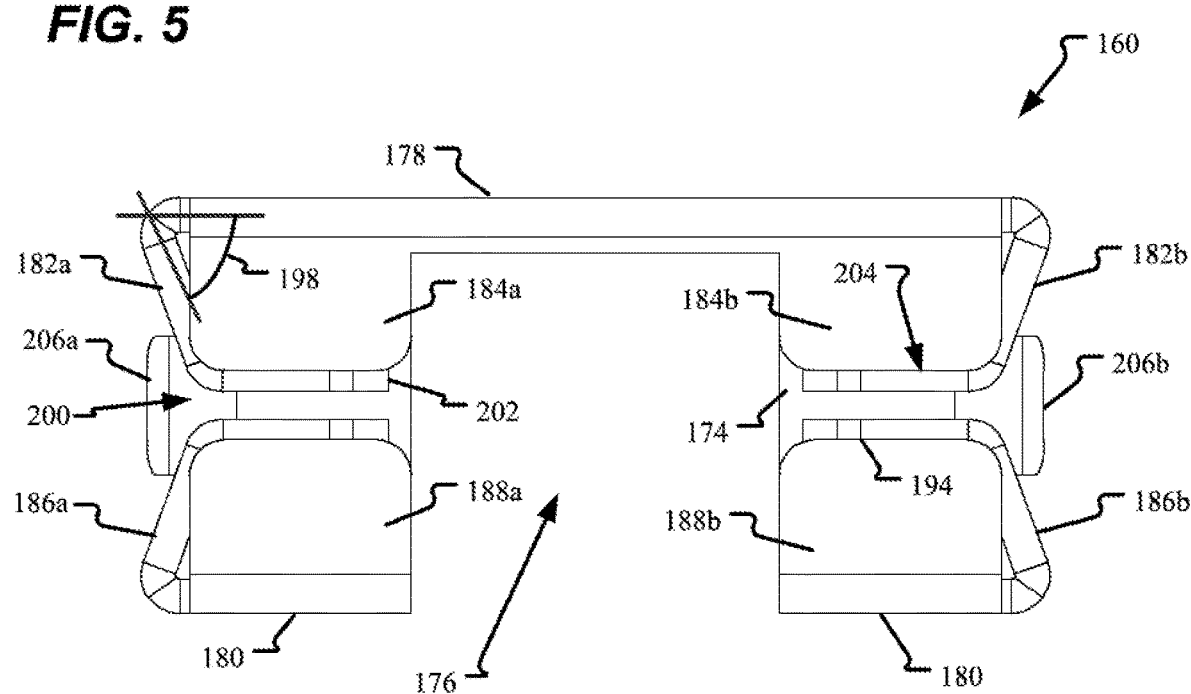
FIG. 5 is a front view of the pin holder shown in FIG. 4.
Figure 6:
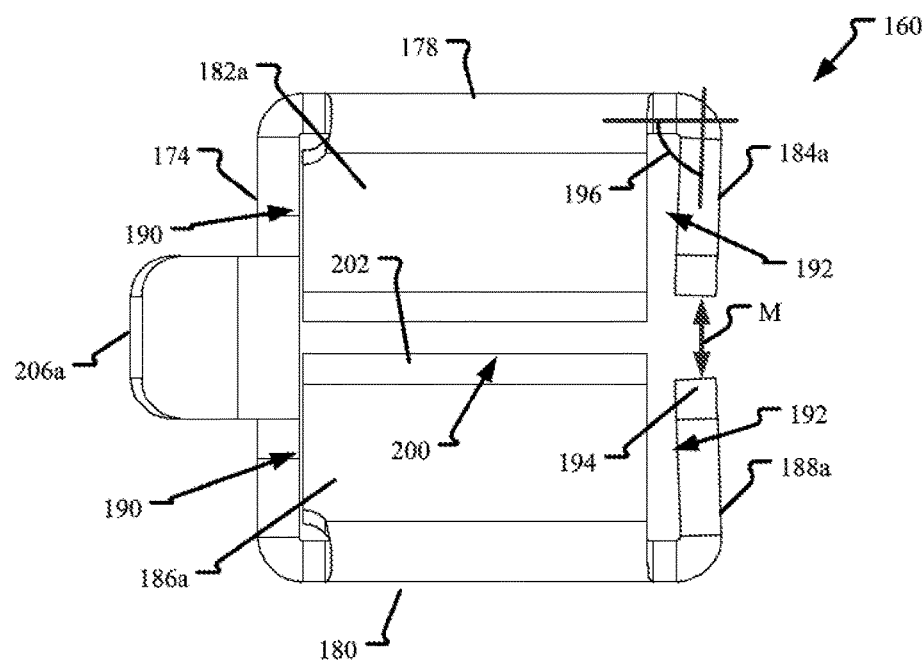
FIG. 6 is a left side view of the pin holder shown in FIG. 4.
Figure 7:
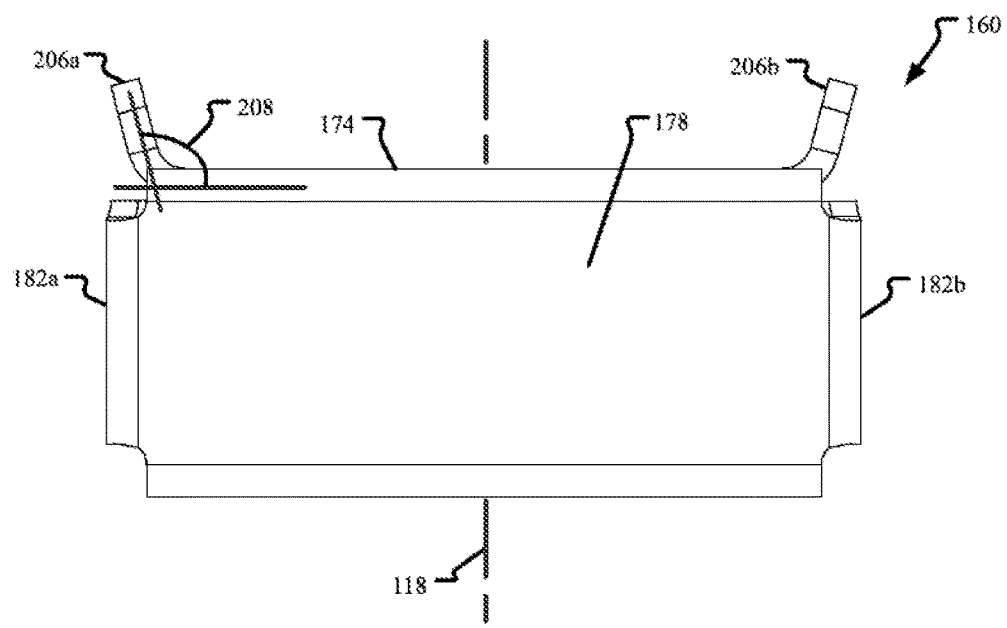
FIG. 7 is a top view of the pin holder shown in FIG. 4.
Figure 8:
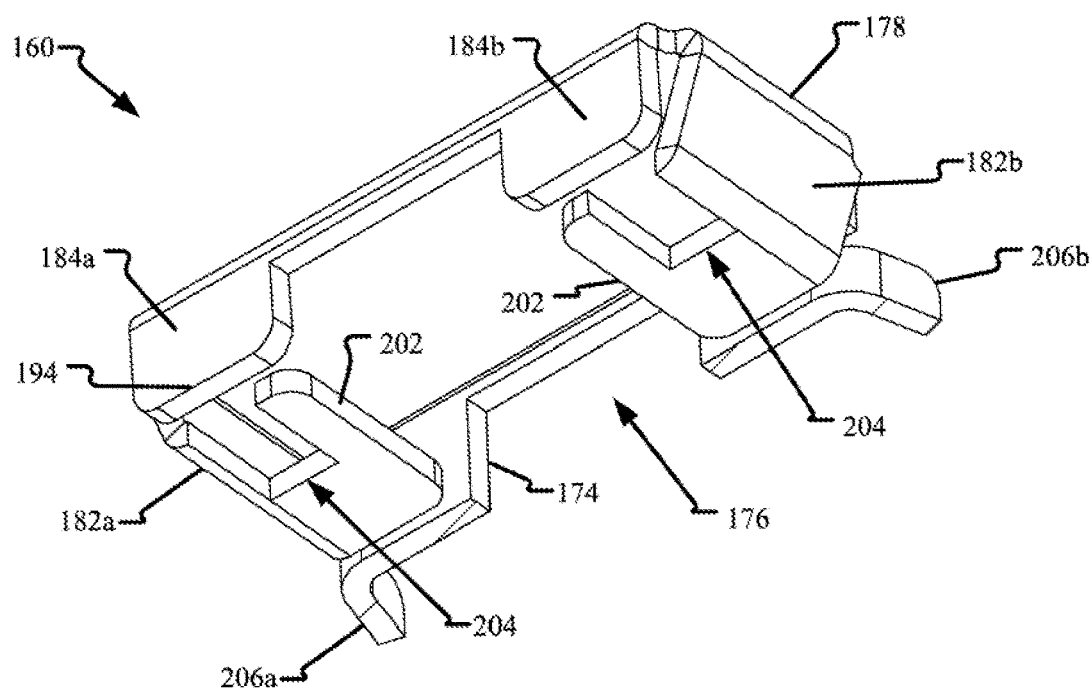
FIG. 8 is a cross-sectional, perspective view of the pin holder shown in FIG. 4.

As illustrated in FIG. 5, each of the left and right, front top and bottom tabs 184, 188 have substantially equal heights and widths. In other examples, one or more of the tabs 184, 188 may have a different size and/or shape than others. This configuration would allow for the pin holder 160 to accommodate other components within the connector body 102 as required or desired. As illustrated in FIG. 6, each of the tabs 184, 188 are angled 196 inwardly relative to the top or bottom plate 178, 180. In an aspect, the angle 196 is acute and less than 90°. As such, the front surface of the tabs 184, 188 tapers inwardly from the top or bottom plate 178, 180 to the distal ends 194. This configuration is configured to receive the rear end of the alignment pins 156 and channel the rear end to the space between the top and bottom tabs 184, 188. Additionally, the configuration enables the alignment pins 156 to be inserted into the pin holder 160 without the use of the tool 168 as required or desired, but restricts or prevents the pins 156 from being removed from the pin holder 160 without the use of the tool 168. In an aspect, the angle 196 may be between 80° and 90°. In yet another aspect, the angle 196 is approximately 88°. In other aspects, the angle 196 may be approximately 90° as required or desired.

Each of the ramps 182, 186 are angled 198 inwardly relative to the top or bottom plate 178, 180 and the central opening 176. In an aspect, the angle 198 is acute and less than 90°. As such, the outer surfaces, relative to the longitudinal axis 118, are oblique surfaces that are configured to at least partially receive and contact the tool 168 when releasing the alignment pins 156. In the example, the top ramps 182 and the bottom ramps 186 taper inwardly (e.g., an outermost portion being proximate the plates 178, 180) such that the tool 168 is channeled towards a distal end of the ramps 182, 186. The distal ends of the ramps 182, 186 are disposed adjacent each other and separated by a passage 200. The passage 200 extends all the way across the ramps 182, 186 from the front tabs 184, 188 to the rear wall 174. By extending the ramps 182, 186 and the passage 200 between the front tabs 184, 188 and the rear wall 174, access to the ramps 182, 186 via the access openings 170 of the connector body 102 (shown in FIG. 3) is easier (e.g., alignment along the longitudinal axis 118) and the ferrule 144 does not necessarily have to be pushed rearward for access to the pin holder 160. The passage 200 is configured to at least partially receive the tool 168 for releasing the alignment pins 156 and allows the top and bottom ramps 182, 186 to separate and move the front tabs 184, 188 towards the pin release position. In an aspect, the angle 198 may be between 50° and 90°. In yet another aspect, the angle 198 is approximately 70°. In other aspects, the angle 198 may be approximately 90° as required or desired.

Each of the left and right, top and bottom ramps 182, 186 include a return member 202. The return member 202 extends towards the central opening 176 and is substantially parallel to the top and bottom plates 178, 180. Respective top and bottom return members 202 are also separated from one another by the passage 200. The transition between the distal end of the ramps 182, 186 and the return member 202 is rounded so as to facilitate receiving the tool. The return members 202 each define a cutout 204 that is configured to receive at least a portion of the rear end of the alignment pin 156. The cutout 204 extends from a front edge of the return member 202, and thus, disposed proximate the front tabs 184, 188 and closer to the ramps 182, 186 than to the distal end of the return member 202.

In the example, the cutout 204 is substantially rectangular in shape. Additionally, the passage 200 has a vertical distance (e.g., the spacing between the top and bottom return members 202) that is less than the spacing between the distal ends 194 of the front top and bottom tabs 184, 188. As such, the cutouts 204 partially define a chamber that is sized and shaped to receive the rear end of the alignment pin 156. The rear ends of the cutouts 204 define a rear backstop for the alignment pin 156 so that over insertion of the alignment pins 156 is restricted or prevented. In other aspects, the vertical spacing between the distal ends 194 and the return members 202 may be about equal as required or desired.

The rear wall 174 includes left and right wings 206a, 206b extending rearwardly. The left and right wings 206a, 206b are configured to engage the spring 110 (shown in FIG. 3). The left and right wings 206a, 206b are disposed on the outermost left and right edges of the rear wall 174 so that use of enlarged springs 110 are enabled. As used herein, springs 110 may be enlarged in the major dimension 150 of the ferrule 144 (shown in FIG. 2). In an aspect, the left and right wings 206a, 206b are centered along the vertical direction (e.g., between the top and bottom plates 178, 180) and axially aligned with the passage 200 between the ramps 182, 186 and the space between the front top and bottom tabs 184, 188. The height of the wings 206 are less than the height of the rear wall 174. In the example, the left and right wings 206a, 206b are disposed at an angle 208 relative to the rear wall 174. In an aspect, the angle 208 is obtuse may be between 90° and 120°. In another aspect, the angle 208 may be approximately 105°. In other aspects, the angle 208 may be about 90°.

Figure 9:
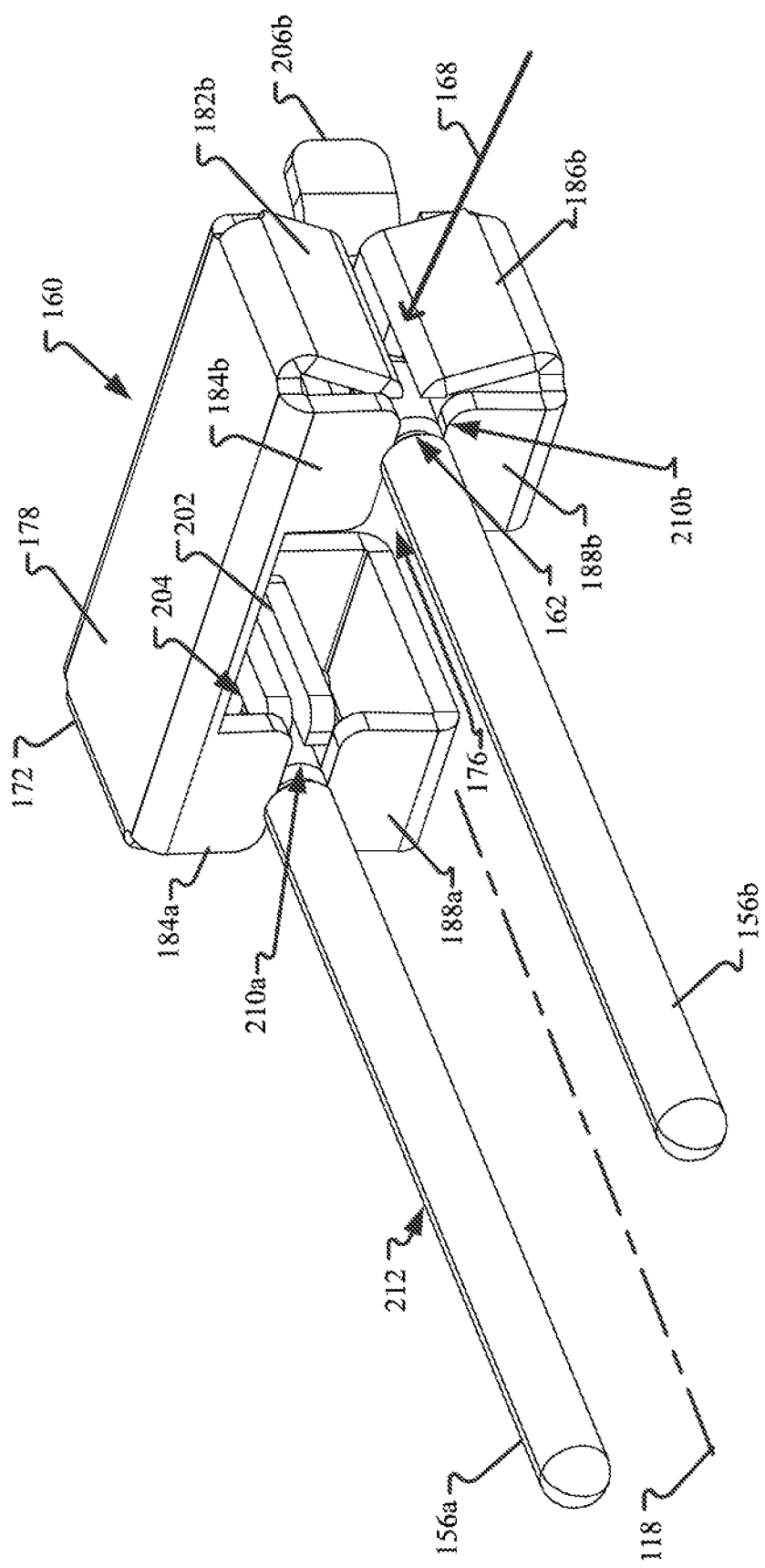
FIG. 9 is a perspective view of the pin holder shown in FIG. 4 with alignment pins attached thereto.
Figure 10:
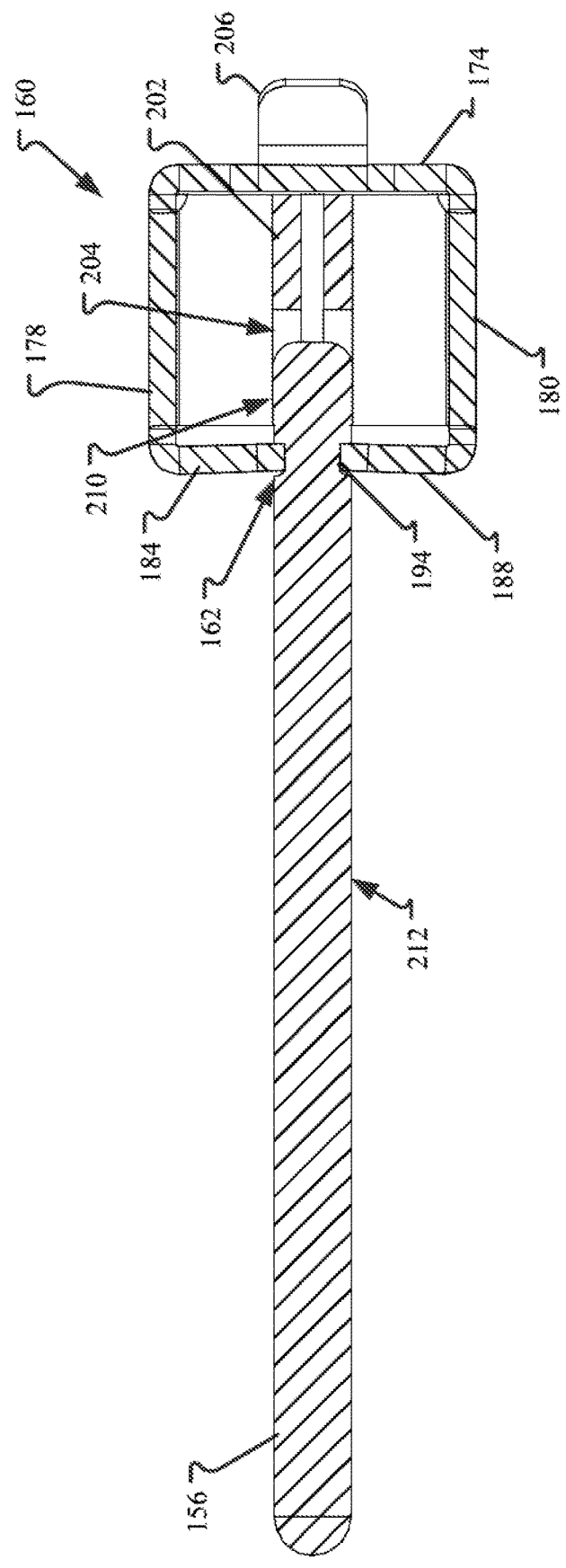
FIG. 10 is a cross-sectional view of the pin holder with attached alignment pins shown in FIG. 9.

FIG. 9 is a perspective view of the pin holder 160 with alignment pins 156a, 156b attached thereto. FIG. 10 is a cross-sectional view of the pin holder 160 with attached alignment pins 156a, 156b. Referring concurrently to FIGS. 9 and 10, certain components are described above, and thus, are not necessarily described further. The pin holder 160 is adapted to secure the ferrule alignment pins 156a, 156b within the alignment pin openings 158a, 158b of the multi-fiber ferrule 144 (shown in FIG. 2), and can be released to allow removal of the alignment pins 156a, 156b from the alignment pin openings 158a, 158b.

The front end (e.g., front tabs 184, 188) of the pin holder 160 is configured to be disposed adjacent the rear end of the multi-fiber ferrule 144 (shown in FIG. 3). Left and right pin receiver chambers 210*a*, 210*b* are defined in the front end of the pin holder 160 extending towards the rear wall 174 along the longitudinal axis 118 and are adapted for receiving the rear ends of the ferrule alignment pins 156*a*, 156*b*. The left and right pin receiver chambers 210*a*, 210*b* are positioned on opposite sides of the open central region 176. When the multi-fiber fiber optic connector 100 (shown in FIGS. 1-3) is assembled, the left and right pin receiver chambers 210*a*, 210*b* align co-axially with the left and right alignment pin openings 158*a*, 158*b* of the multi-fiber ferrule 144 so that the rear ends of the ferrule alignment pins 156*a*, 156*b* can be received within the pin holder 160. In the example, the left and right pin receiver chambers 210*a*, 210*b* are at least partially defined by the front top and bottom tabs 184, 188 and the cutouts 204 of the return members 202 of the top and bottom ramps 182, 186.

The pin holder 160 is configured to move between a pin retaining position, as shown in FIGS. 9 and 10, and a pin release position. The pin holder 160 is formed from a resilient material such that the pin holder 160 is biased towards the pin retaining position, unless moved towards the pin release position via use of the tool 168. In the pin retaining position, the distal ends 194 of the left and right, front top and bottom tabs 184, 188 are positioned the closest to each other and engage at least partially within the circumferential groove 162 of the corresponding alignment pin 156. In the example, the front top and bottom tabs 184, 188 engage opposing top and bottom outer sides of the alignment pins 156 to retain the rear end within the pin receiver chambers 210. This engagement restricts or prevents the alignment pins 156 from being pulled out of the front of the connector 100 along the longitudinal axis 118 without first moving the pin holder 160 towards the pin release position.

In order to move the pin holder 160 to the pin release position, the tool 168 is utilized. In the pin holder 160 described herein, the tool 168 can be used to move the pin holder 160 from the pin retaining position to the pin release position without requiring the fiber optic connector 100 to be disassembled. The tool 168 is insertable through the connector body 102 via the access openings 170 (shown in FIG. 3) to reach and contact the corresponding left and right, top and bottom ramps 182, 186. A tip of the tool 168 is used to spread the top and bottom ramps 182, 186 apart and enlarge the passage 200 therebetween. For example, the top ramps 182 are moved towards the upper major side 114*a* of the connector body 102, while the bottom ramps 186 are moved towards the lower major side 114*b* of the connector body 102. In an aspect, the tip of the tool 168 may be used as a wedge to spread the ramps 182, 186 apart, and for example, be a substantially cylindrical member. In other examples, the tip of the tool 168 may have a rectangle or similar shape such that it can be rotated once at least partially inserted into the passage 200 and to spread the ramps 182, 186 apart.

The movement of the pin holder 160 between the pin retaining position to the pin release position is caused by the inherent elasticity/resiliency of the body 172. To release/unlock the alignment pin 156 from the pin holder 160 so as to allow removal of the alignment pins 156 from the multi-fiber ferrule 144, the tool 168 is used to move the pin holder 160 from the pin retaining position to the pin release position (e.g., via the ramps 182, 186). With the pin holder 160 held in the release position, the alignment pin 156 can be pulled forwardly out of the multi-fiber fiber optic connector 100.

In the example, the movement of the ramps 182, 186 towards the pin release position at least partially flexes the top and bottom plates 178, 180 away from each other relative to the rear wall 174 so as to displace the distal ends 194 of the left and right, front top and bottom tabs 184, 188. This displacement of the front tabs 184, 188 is also towards the major sides 114 of the connector body 102 and substantially orthogonal to the longitudinal axis 118 defining the pin release position. In the pin release position, the distal ends 194 of the left and right, front top and bottom tabs 184, 188 disengage from the circumferential groove 162 of the alignment pins 156 and allow the alignment pins 156 to release from the pin holder 160 and be removed from the connector.

In an aspect, using the tool 168 on the left side of the pin holder 160 and spreading apart the left, top and bottom ramps 182*a*, 186*a* releases the left alignment pin 156*a*, while using the tool 168 on the right side of the pin holder 160 and spreading apart the right, top and bottom ramps 182*b*, 186*b* releases the right alignment pin 156*b*. In other aspects, the pin holder 160 may be substantially rigid enough to release both the left and right, top and bottom ramps 182, 186 when the tool 168 is used on only one side of the pin holder 160.

To load one of the ferrule alignment pins 156 into one of the ferrule alignment pin openings 158, the alignment pin 156 is inserted rearwardly into the alignment pin openings 158 of the ferrule 144. During the insertion process, the rear end of the alignment pin 156 engages the front top and bottom tabs 184, 188 of the pin holder 160 thereby forcing the pin holder 160 to flex from the pin retaining position to the pin release position. Alternatively, the tool 168 can be used to move the front top and bottom tabs 184, 188 from the pin retaining portion to the pin release position. With continued rearward insertion of the alignment pin 156, the rear end of the pin 156 moves past the distal ends 194 of the front top and bottom tabs 184, 188 and the distal ends 194 engages and slides along an outer surface 212 of the pin 156 such that the outer surface 212 of the pin 156 holds the pin holder 160 in the pin release position. When the circumferential groove 162 of the alignment pin 156 moves into alignment with the distal ends 194 of the front top and bottom tabs 184, 188, the distal ends 194 snap into the circumferential groove 162, and thereby, the pin holder 160 moves from pin release position to the pin retaining position such that the alignment pin 156 is locked/retained within the ferrule assembly 108 (shown in FIG. 3).

In the example, the alignment pins 156 are inserted and removed in a direction that is substantially parallel to the longitudinal axis 118. In some examples, prior to the pin holder 160 being assembled within the connector body 102, the rear ends of the alignment pins 156 may be inserted into the pin receiver chambers 210 via the corresponding left and right, top and bottom ramps 182, 186 and through the passage 200 that is open in the direction of the minor sides 116 of the connector body 102. In this example, the alignment pins 156 may be used to spread apart the top and bottom ramps 182, 186 and into engagement with the distal ends 194 of the front top and bottom tabs 184, 188. This allows the alignment pins 156 to be inserted into the pin holder 160 in a direction that is substantially orthogonal to the longitudinal axis 118. It should be appreciated that this feature of the pin holder 160 is not available when the pin holder 160 is disposed within the connector body 102.

What is claimed is:
1. A fiber optic connector comprising:
 a connector body having a front end and a rear end, the connector body defining a longitudinal axis extending between the front end and the rear end;
 a multi-fiber ferrule disposed within the connector body and biased towards the front end of the connector body, the multi-fiber ferrule including a front end, a rear end, a plurality of fiber openings for receiving optical fibers, and a pair of alignment pin openings that extend between the front end and the rear end;

a main grip-sleeve body mounted on the connector body and movable relative to the connector body along the longitudinal axis between a forward position and a rearward position;

a pair of alignment pins selectively mountable in the pair of alignment pin openings of the multi-fiber ferrule, each alignment pin has a circumferential groove defined adjacent a rear end of the alignment pin; and a pin holder disposed within the connector body and positioned at the rear end of the multi-fiber ferrule, the pin holder configured to releasably retain the pair of alignment pins within the pair of alignment pin openings, the pin holder comprising:

a rear wall;

a top plate extending from the rear wall and having left and right top ramps extending therefrom and left and right front top tabs extending therefrom opposite the rear wall, wherein each of the left and right front top tabs are adjacent a respective ramp of the left and right top ramps and spaced therefrom by a gap; and at least one bottom plate extending from the rear wall and having left and right bottom ramps extending therefrom and left and right front bottom tabs extending therefrom opposite the rear wall, wherein each of the left and right front bottom tabs are adjacent a respective ramp of the left and right bottom ramps and spaced therefrom by a gap;

wherein opposing distal ends of the left and right, front top and bottom tabs are movable relative to each other between a pin retaining position and a pin release position, wherein when the left and right, front top and bottom tabs are in the pin retaining position, the distal ends are engaged at least partially within the circumferential groove of a corresponding alignment pin of the pair of alignment pins, and when the left and right, front top and bottom tabs are in the pin release position, at least a portion of corresponding left and right, top and bottom ramps are spread apart from one another flexing the top and the at least one bottom plates away from each other and disengaging the distal ends from the alignment pin.

2. The fiber optic connector of claim 1, wherein the rear wall is spaced apart from the left and right, top and bottom ramps by a gap.

3. The fiber optic connector of claim 1, wherein each of the left and right, top and bottom ramps are disposed at an acute angle relative respectively to the top or the at least one bottom plate.

4. The fiber optic connector of claim 1, wherein corresponding left and right, top and bottom ramps, are separated by a passage configured to at least partially receive a tool to move the left and right, front top and bottom tabs towards the pin release position.

5. The fiber optic connector of claim 1, wherein each of the left and right, top and bottom ramps include a return member defining a cutout configured to receive at least a portion of the rear end of the alignment pin.

6. The fiber optic connector of claim 5, wherein the cutout of each return member is disposed proximate the left and right, front top and bottom tabs.

7. The fiber optic connector of claim 5, wherein each return member is substantially parallel to the top and the at least one bottom plates.

8. The fiber optic connector of claim 1, wherein each of the left and right, front top and bottom tabs are disposed at an acute angle relative respectively to the top or the at least one bottom plate.

9. The fiber optic connector of claim 1, wherein the rear wall includes left and right wings configured to engage a ferrule spring.

10. The fiber optic connector of claim 9, wherein each of the left and right wings are disposed at an obtuse angle relative to the rear wall.

11. A fiber optic connector comprising:

a connector body extending along a longitudinal axis and including opposing major sides and opposing minor sides, wherein each of the opposing minor sides defines an access opening;

a multi-fiber ferrule disposed within the connector body and including left and right alignment pin openings that extend along the longitudinal axis;

a main grip-sleeve body slidably mounted on the connector body;

left and right alignment pins mountable in the left and right alignment pin openings of the multi-fiber ferrule; and a pin holder disposed within the connector body and configured to releasably retain the left and right alignment pins within the left and right alignment pin openings, the pin holder comprising:

a rear wall;

a top plate extending from the rear wall and having left and right top ramps extending therefrom and left and right front top tabs extending therefrom opposite the rear wall, wherein each of the left and right top ramps are disposed proximate the respective access opening of the connector body, and each of the left and right front top tabs are adjacent a respective ramp of the left and right top ramps and spaced therefrom by a gap; and at least one bottom plate extending from the rear wall and having left and right bottom ramps extending therefrom and left and right front bottom tabs extending therefrom opposite the rear wall, wherein each of the left and right bottom ramps are disposed proximate the respective access opening of the connector body, and each of the left and right front bottom tabs are adjacent a respective ramp of the left and right bottom ramps and spaced therefrom by a gap;

wherein corresponding left and right, top and bottom ramps are separated by a passage, the passage extending between the rear wall and the left and right, front top and bottom tabs, wherein opposing distal ends of the left and right, front top and bottom tabs selectively retain the left and right alignment pins and are movable relative to each other between a pin retaining position and a pin release position, and wherein upon inserting a tool within the access opening, the tool contacts corresponding top and bottom ramps to spread apart the left and right, front top and bottom tabs in a direction substantially orthogonal from the longitudinal axis and towards the major sides of the connector body defining the pin release position.

12. The fiber optic connector of claim 11, wherein the distal ends of the left and right, front top and bottom tabs are substantially planar.

13. The fiber optic connector of claim 11, wherein each of the top and bottom, left and right ramps extend between and are spaced apart from the rear wall and the respective left and right, front top and bottom tabs.

14. The fiber optic connector of claim 11, wherein the pin holder is substantially U-shaped.

15. The fiber optic connector of claim 11, wherein the rear wall includes left and right wings extending respectively from left and right edges of the rear wall.

16. A fiber optic connector comprising:
a connector body having opposite front and rear ends, the connector body also including opposite upper and lower major sides that extend lengthwise between the front and rear ends, the connector body further including opposite left and right minor sides that extend between the upper and lower major sides and also extend lengthwise between the front and rear ends, the connector body defining a central longitudinal axis that extends between the front and rear ends;
a multi-fiber ferrule positioned within the connector body adjacent the front end, the multi-fiber ferrule having an elongate transverse cross-sectional profile defining perpendicular major and minor dimensions, the major dimension extending between the left and right minor sides of the connector body and the minor dimension extending between the upper and lower major sides, the multi-fiber ferrule defining a plurality of fiber openings for receiving optical fibers, at least one of the fiber openings being arranged in a row that extends along the major dimension of the multi-fiber ferrule, the multi-fiber ferrule being movable relative to the connector body along the central longitudinal axis of the connector body, the multi-fiber ferrule defining left and right alignment pin openings that extend along the central longitudinal axis of the connector body when the multi-fiber ferrule is positioned within the connector body;
a spring stop mounted within the rear end of the connector body;
a ferrule spring for biasing the multi-fiber ferrule in a forward direction relative to the connector body, the ferrule spring being located within the connector body and being captured between the spring stop and the multi-fiber ferrule;
a main grip-sleeve body mounted on the connector body, the main grip-sleeve body including upper and lower major sides that respectively oppose the upper and lower major sides of the connector body, the main grip-sleeve body also including left and right minor sides that respectively oppose the left and right minor sides of the connector body, the main grip-sleeve body being movable relative to the connector body along the central longitudinal axis of the connector body between a forward position and a rearward position;
left and right alignment pins mountable in the left and right alignment pin openings of the multi-fiber ferrule, the left and right alignment pins further including circumferential grooves defined adjacent rear ends of the left and right alignment pins; and
a pin holder positioned at a rear end of the multi-fiber ferrule for releasably retaining the left and right alignment pins within the left and right alignment pin openings, the pin holder including:
a rear wall having left and right wings extending therefrom, the left and right wings configured to engage with the ferrule spring;
a top plate extending from the rear wall and having left and right top ramps extending therefrom and left and right front top tabs extending therefrom opposite the rear wall, wherein each of the left and right top ramps are disposed proximate the minor sides of the connector body and each of the left and right front top tabs are adjacent a respective ramp of the left and right top ramps and spaced therefrom by a gap; and
at least one bottom plate extending from the rear wall and having left and right bottom ramps extending therefrom and left and right front bottom tabs extending therefrom opposite the rear wall, wherein each of the left and right bottom ramps are disposed proximate the minor sides of the connector body and each of the left and right front bottom tabs are adjacent a respective ramp of the left and right bottom ramps and spaced therefrom by a gap;
wherein opposing distal ends of the left and right, front top and bottom tabs are movable relative to each other between a pin retaining position and a pin release position, wherein when the left and right, front top and bottom tabs are in the pin retaining position, the distal ends are engaged at least partially within the circumferential groove of a corresponding alignment pin of the left and right alignment pins.

17. The fiber optic connector of claim 16, wherein each of the opposing minor sides of the connector body defines a tool access opening, and corresponding left and right, top and bottom ramps are longitudinally aligned with the tool access opening, and wherein upon inserting a tool within the tool access opening, the tool contacts the corresponding top and bottom ramps to spread apart the left and right, front top and bottom tabs in a direction along the minor dimension and towards the major sides of the connector body defining the pin release position.

18. The fiber optic connector of claim 16, wherein each of the left and right, top and bottom ramps include a return member defining a cutout configured to receive at least a portion of the rear end of the respective alignment pin, and wherein each return member is substantially parallel to the top and the at least one bottom plates.

19. The fiber optic connector of claim 16, wherein the at least one bottom plate includes two discrete members.

20. The fiber optic connector of claim 16, wherein the distal ends of the left and right, front top and bottom tabs are devoid of notches that correspond in shape to the left and right alignment pins.

21. The fiber optic connector of claim 16, wherein front surfaces of the left and right, front top and bottom tabs taper inwardly respectively from the top or at least one bottom plate.

* * * * *